June 19, 1928.
O. S. HERSHEY
1,674,395
AUTOMOBILE LOCK
Filed Aug. 23, 1923
4 Sheets-Sheet 3
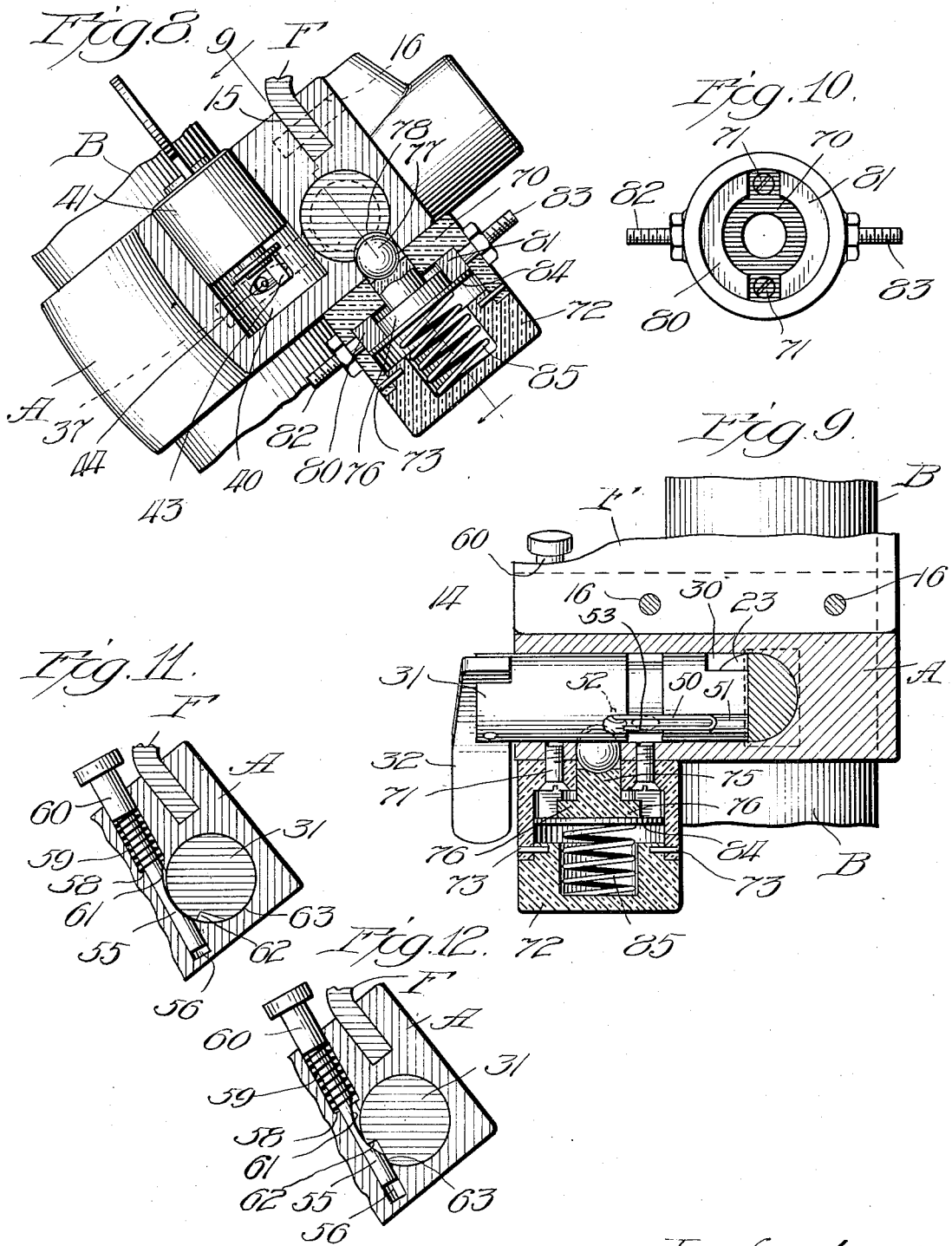
Inventor:
Orville S. Hershey
by Chumny & Chumny
Attys June 19, 1928.
O. S. HERSHEY
1,674,395
AUTOMOBILE LOCK
Filed Aug. 23, 1923
4 Sheets-Sheet 4
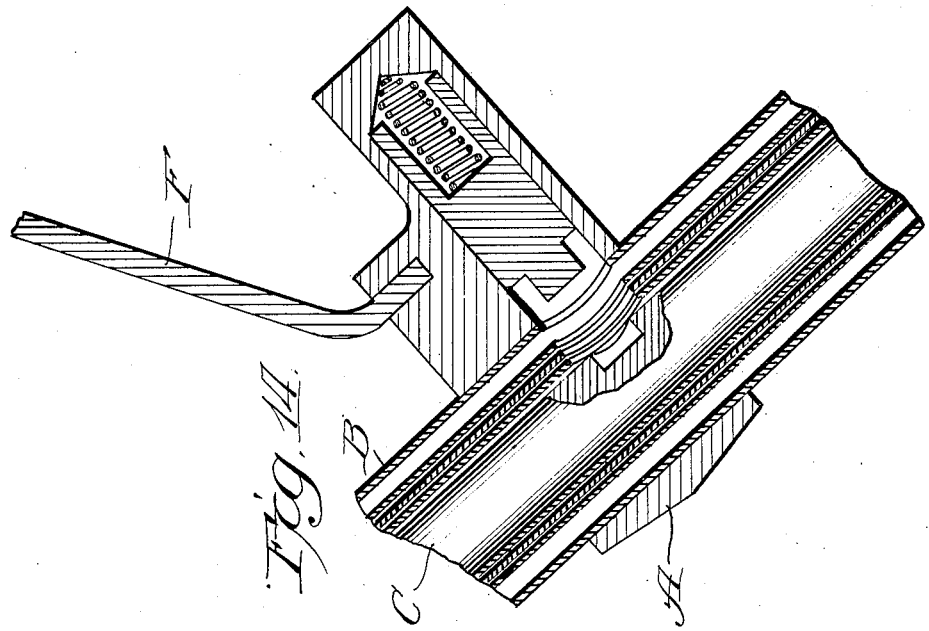
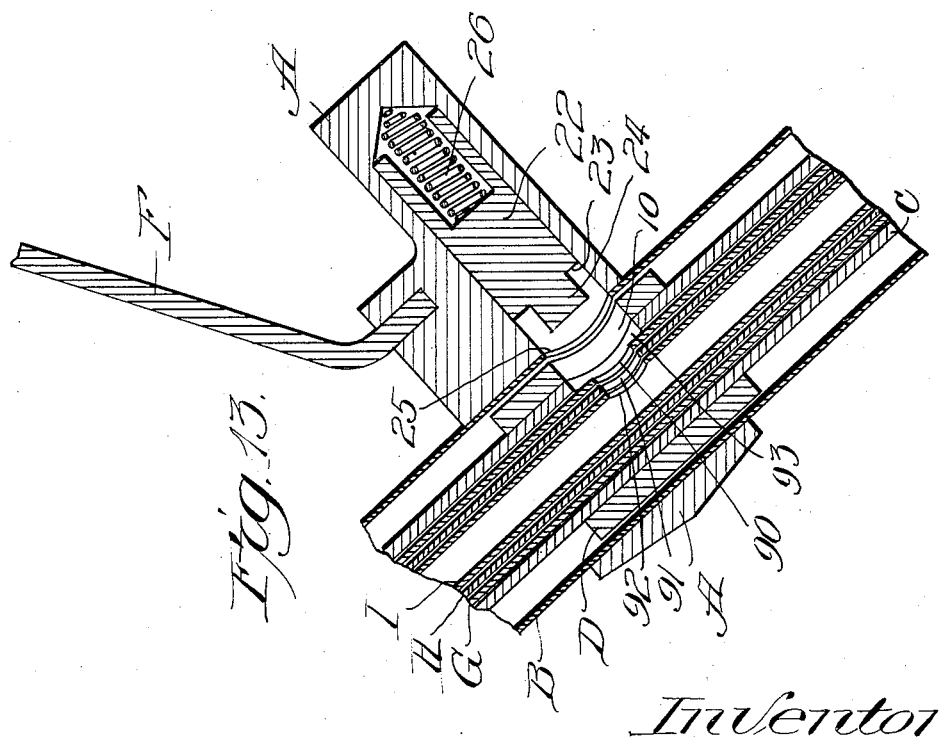
Inventor:
Orville S. Hershey Patented June 19, 1928.

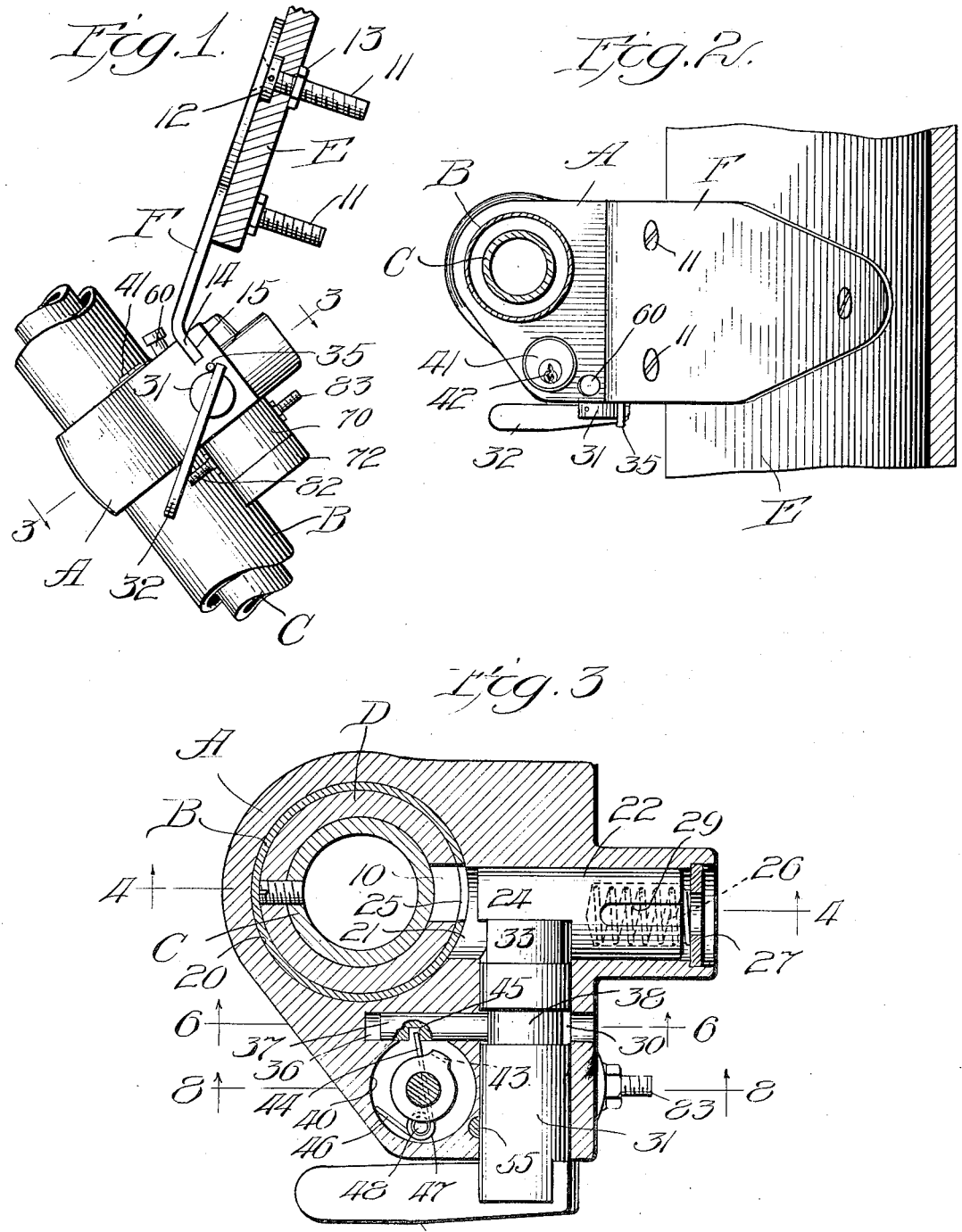

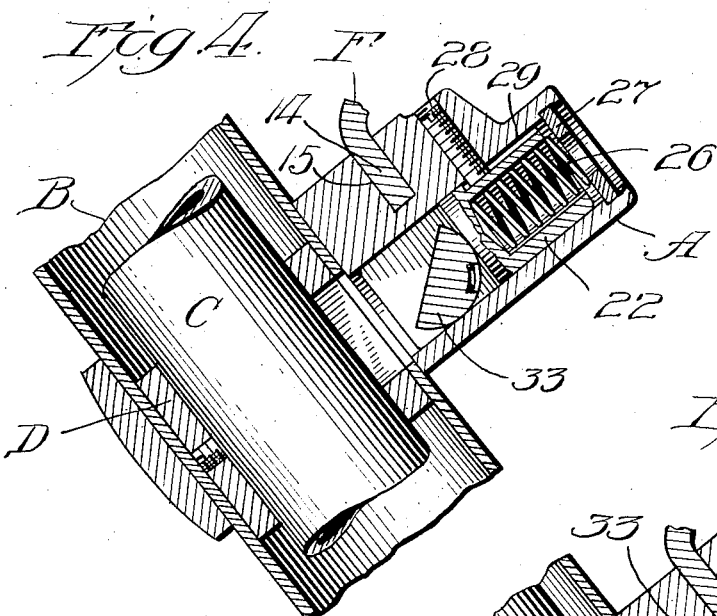
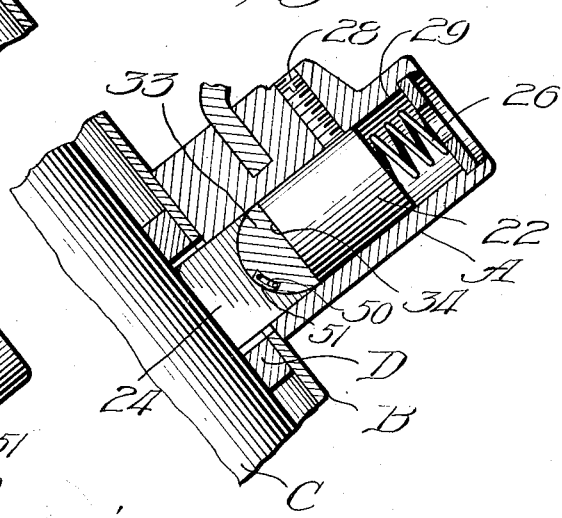
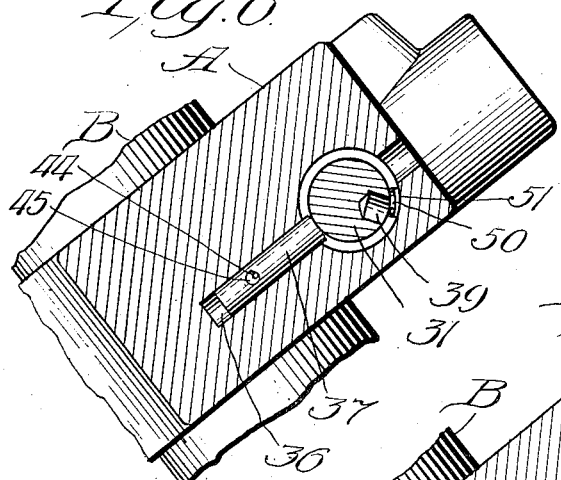
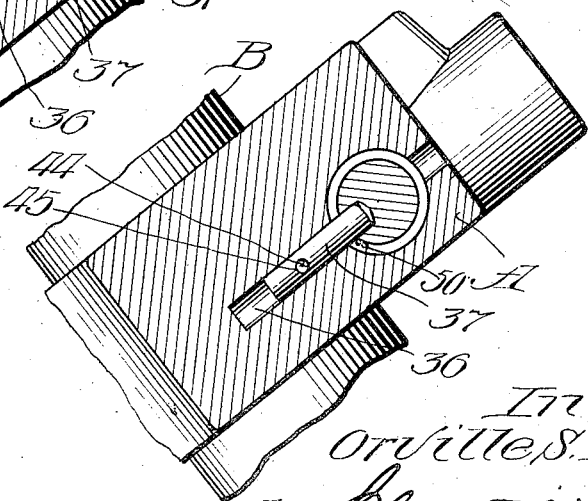

1,674,395

UNITED STATES PATENT OFFICE.

ORVILLE S. HERSHEY, OF CHICAGO, ILLINOIS, ASSIGNOR TO HERSHEY MANUFACTURING COMPANY, OF CHICAGO, ILLINOIS, A CORPORATION OF COLORADO.

AUTOMOBILE LOCK.

Application filed August 23, 1923. Serial No. 658,880.

This invention relates to certain improvements in automobile locks, and more particularly to locks that are associated with the steering column of a motor driven vehicle to secure against rotation either the column or a post therewithin which connects the steering wheel with the swiveled running wheels at the front of the vehicle.

It is a primary object of my invention to provide a lock of simple, practical and efficient construction which may be contained within a housing that surrounds the steering column of an automobile, and which also may connect with a fixed part of the vehicle such as the dash or instrument board so as to serve as a bracket for supporting the steering column; to incorporate within such a housing an ignition lock which operates in conjunction with the steering lock whereby the motor, as well as the vehicle, may be prevented from operating; to provide self adjusting means for connecting the housing to an instrument board the angular position of which varies in the different makes of automobiles; and to provide also with such a lock other means for preventing manipulation of the spark gas, and gear shift controls, if this be desired. Other objects as well will hereinafter appear from the description and claims to follow wherein this invention is represented as consisting of parts which are constructed and arranged in accordance with the exemplifications shown in the accompanying drawings in the manner following:

Figure 1 shows in side elevation the present lock applied to a steering column, with a bracket connection extended to the instrument board;

Fig. 2 is a plan view looking down upon the lock in a direction which parallels the axis of the column;

Fig. 3 is an enlarged transverse section through the lock taken on line 3—3 of Fig. 1;

Fig. 4 is a longitudinal section through the lock taken on line 4—4 of Fig. 3;

Fig. 5 is a similar view with certain of the parts moved to another position;

Fig. 6 is a longitudinal section through the lock taken on line 6—6 of Fig. 3;

Fig. 7 is a similar view with certain of the parts moved to another position;

Fig. 8 is a longitudinal section through the lock taken on line 8—8 of Fig. 3;

Fig. 9 is a longitudinal section through the lock taken in the plane of line 9—9 of Fig. 8;

Fig. 10 shows in elevation the interior of the ignition switch box, the cap being removed from the view;

Fig. 11 is a fragmentary detail in section taken in the plane of the safety pin;

Fig. 12 is a similar view showing the parts moved to another position;

Fig. 13 is a view in longitudinal section taken through the lock in a plane which coincides with the axis of the column and shows the lock applied to a column wherein the steering post itself surrounds certain concentric tubes which connect the spark, gas, and gear shift controls with the ignition, carburetor and transmittion mechanims, respectively; and Fig. 14 is a similar view except that the concentric tubes are arranged in surrounding relation to the steering post which occupies an innermost position within the column.

The lock represented in Figs. 1 to 12 inclusive is contained within a housing A adapted for mounting upon the column B which, in the construction shown, surrounds in spaced relation an automobile steering post C, here represented as a tube. Secured fast to the post in the region of the lock is a collar D having a longitudinal groove 10. Since the collar is associated with the post primarily to facilitate construction, and is to all intents and purposes a part thereof, it will be so treated in the description and claims to follow.

As shown, the present lock housing is designed also for connection with a fixed part of the automobile, such as its dash or instrument board E. A bracket plate F is used for this purpose, and it is provided with suitable openings through which bolts or screws 11 are extended with their heads preferably countersunk in the plate. Secured to each bolt adjacent the rear side of the plate is a washer or nut 12 that may be pinned or otherwise made fast thereto. The several bolts are extended also through openings in the dash or instrument board, the washer or nut in each instance lying within a suitable enlargement so as to permit the bracket plate to rest flat against the board. When so positioned a nut 13 is applied to the bolt so as to bear against the rear side of the board. In this manner the plate may be conveniently attached in place, and the extension of its several bolts through the board will act to prevent any rotary movement of the bracket relative to the dash even though the nuts 13 should work off.

At its lower edge 14 the bracket plate is received within a slot 15 which is formed across the upper face of the housing. Preferably the width of this slot is such that the plate edge may lie freely therein so as to adjust itself slightly to the angular relation which obtains between the instrument board and the column. As shown, the slot 15 proceeds inwardly in substantial parallelism to the axis of the column, necessitating a bend in the lower plate edge in order that it may extend over to rest flat on the dash. By assembling with the lock housing a bracket plate having the required angular bend along its lower edge, a satisfactory connection may be made with the dash of any automobile. When the plate is once entered into the slot, it may be secured in place with the aid of one or more screws or pins 16 (see Figs. 8 and 9) which extend through the rear side of the housing and also through suitable openings in the plate edge. The assembly of the bracket plate with the housing would in ordinary practice be effected previous to attachment of the plate to the instrument board in order to promote convenience in handling.

The housing may derive its sole support from the dash board through the medium of the bracket plate, or, if desired, be secured additionally to the column by any appropriate means. Within the housing body are formed certain cylindrical passages for the reception of the operating parts, as will now be explained. A main longitudinal passage 20 for the reception of the column is provided through the body of the housing. Intersecting this passage is a rearwardly extending passage 21 wherein is received a slidable locking bolt 22. This latter passage is shown as slightly offset with respect to the axis of the column, and the acting end of the locking bolt is also recessed at 23 along its offset side whereby its resultant head 24 is aligned directly with the axis of the column. A slot 25 is formed in the column permitting the head to pass therethrough to engage within the groove 10 of the collar D, when the locking bolt is advanced to a forward position. The rear end of this bolt is preferably socketed to receive a coiled spring 26 which bears against a plate 27 that is secured in place at the rear end of the passage 21, the effect being to normally project the locking bolt into a forward position where the column, and the steering post, are prevented from turning. Also I would employ suitable means for holding the locking bolt against turning, and this may consist of a pin or screw 28 which extends into the housing body, preferably from its upper side and rearwardly of the slot 15, in a manner to present its inner end within a slot 29 that is formed longitudinally along the upper side of the bolt (see Figs. 3 and 4). Such an arrangement allows the bolt to slide freely and project its head 24 through the column slot 25 into locking engagement with the collar groove 10, and at the same time prevents turning of this bolt with a consequent misalignment of its head relative to the associated parts.

The body of the housing is provided further with a passage 30 which intersects the passage 21 and leads therefrom to the exterior of the housing at one side thereof. Positioned within the passage 30 is a rock shaft 31 one end of which lies to the outside of the housing to connect with an operating handle 32. The opposite end 33 of the rock shaft is in the form of a half round so as to engage with the bolt shoulder formed by the recess 23 to thereby retract the locking bolt when the round surface of the shaft end is in engagement therewith, as shown in Fig. 4. When the rock shaft is rotated so as to present its flat surface 34 to the bolt, this latter element will be permitted to advance, under the action of the spring 26, into locking position (see Fig. 5). This half round formation at the rock shaft end is a simple form of cam admirably suited to the purposes of my invention, and requires an operating movement of less than 180°. As shown a pin 35 may be used as a stop member with which to engage the handle 32, thereby defining the limits of shaft movement in both directions.

Extending into the body of the housing from the rear side and intersecting the passage 30 is another smaller passage 36 in which is a detent in the form of a locking pin 37. The rock shaft is also formed with an annular groove 38 wherein the acting pin end is normally rested so as to prevent endwise movement of the shaft, and its consequent withdrawal from the housing. I further provide a socket 39 extending axially from the groove 38 and adapted at times to receive the acting end of the locking pin. When the rock shaft is rotated to the position required (see Fig. 7), this pin is capable of engaging within the socket so as to lock the shaft against turning.

Intersecting the passage 36 is another passage 40 which extends out to the upper side of the housing. Within this last passage is secured a rotatable cylinder lock 41 of ordinary construction having the usual entry slit 42 for the reception of an operating key. At the rear end of the cylinder lock is an eccentric lug 43 adapted to engage with one arm 44 of a spring whose extremity is lodged within a notch 45 formed in the side of the pin 37. The spring is represented as having a second arm 46 which bears against a wall of the passage 40, and as being coiled at 47 about a pin or boss 48 which is located at the rear end of the passage.

By the means described, the two arms of the spring exert a diverging pressure such as to normally cause the locking pin to remain engaged with the annular groove of the rock shaft, and to enter the socket 39 therein when the rock shaft is turned to the required position for this purpose. This relationship of the parts is subject to change, however, with rotation of the cylinder lock and the consequent engagement of its eccentric lug 43 with the spring arm 44 for the purpose of retracting the same together with the pin whose movements are controlled thereby. It is contemplated that the socket 39 shall be so located circumferentially of the rock shaft that, when the locking pin is engaged therein, the flat surface 34 will be turned to the locking bolt 22, thereby permitting this element to occupy a forward position where it operates to interfere with the steering; or, stated reversely, when the steering mechanism is locked, the locking pin 37 holds the rock shaft against turning, thereby preventing retraction of the locking bolt 22, and the concomitant release of the steering mechanism.

By use of a proper key the cylinder lock may be rotated to effect a withdrawal of the locking pin from engagement with the shaft socket 39. To hold the pin in such disengaged relation until rotation of the rock shaft can be started, I provide a spring 50 which is disposed within a recess 51 formed longitudinally on the periphery of the rock shaft. As shown, the spring is in the form of a reversely bent wire having one end 52 anchored to the rock shaft so as to permit its opposite end 53 to move in between the socket and acting end of the locking pin. It is only when the pin is retracted sufficiently for this purpose with the aid of the cylinder lock that the spring end 53 can occupy this position; and with commencement of rotation of the rock shaft the spring is moved away from the locking pin permitting it to rest within the annular groove 38 and in position to re-enter the socket 39 when the rock shaft is again rotated to the required position. Some such means as this is desirable so that it will not be necessary to operate the cylinder lock and handle 32 concurrently in order to release the steering mechanism for operation.

Associated with the rock shaft is a safety pin 55 which is slidably received within a passage 56 that may conveniently extend from the upper side of the housing into the body thereof in intersecting relation to one side of the passage 30 wherein the rock shaft is journaled. For a portion of its length adjacent the outer end, the passage 56 is enlarged so as to provide an annular shoulder 58 against which pressure is exerted by a coiled spring 59 surrounding the pin and bearing also against a head 60 thereon which is adapted to be slidably received within the enlarged end of the passage 56. By the means described, the pin is normally maintained in an outer position as represented in Fig. 12. The body of the pin near its inner end is cut away to provide a longitudinally extending arc-shaped recess 61, the curvature of which is slightly greater than the periphery of the rock shaft. Adjacent the pin a notch is formed in the rock shaft so as to provide, in effect, two shoulders 62 and 63. When the safety pin is manually pressed inwardly against the tension of the spring 59, the arc-shaped recess will occupy a position substantially as is shown in Fig. 11. Free rotation of the rock shaft, in the absence of any other restraining influence, is permitted in this relationship of the parts. If, however, the rock shaft be rotated to the position of Fig. 12, the safety pin will move outwardly to engage the shoulders 62 and 63 so as to prevent extended rotation of the rock shaft. It is while the parts are related as in Fig. 12 that the rock shaft holds the locking bolt from interfering with the steering operations, and the safety pin serves to guard against any change in this relationship such as might prove disastrous to operation of the vehicle. By first pushing the pin in, however, and then the handle 32, the rock shaft may be rotated to a position which permits the locking bolt to spring into interfering position with the steering post, these operations dispensing with the use of any key in the cylinder lock.

With such a construction, however, it is possible to conveniently associate a switch by which the ignition circuit may be closed or broken, thus combining with the steering lock a lock for the motor as well. Such a switch is set forth in Figs. 8, 9, and 10 to which reference will now be made.

Secured to the lock housing, preferably on its under side, is a cup-shaped box of insulating material having a wall 70 through which screws 71 or other equivalent devices are extended for connection with the housing. Over the open side of the box is fitted a cap 72 and by means of pins 73, or any other suitable locking device, the cap is securely held in place. With the parts formed and assembled in this manner, the connecting screws 71 may not be tampered with.

Formed centrally in the box bottom is an opening wherein is received a plunger 75 on which is formed a head 76 forming part of an ignition switch to be presently described. Adjacent the inner end of the plunger is a ball 77 which is also in engagement with the rock shaft in a circumferential plane wherein is formed a socket 78 adapted to partly receive the ball only when the rock shaft is turned to the position of Figs. 8 and 3. In any other position, however, the socket 78 is moved away from the ball with the result that this latter element is projected further from the axis of the rock shaft so as to force the plunger outwardly an equal distance. It is contemplated as part of this invention that the rock shaft may, if desired, function primarily as an operating medium for the ignition switch, and in furtherance of such an end, the socket 78 should be so located circumferentially of the rock shaft as to receive the ball 77 in advance of the shaft coming to the position of Fig. 5. In other words, with the parts set for operation of the motor and the steering mechanism, manipulation of the handle 32 will lock first the ignition and then disable the steering mechanism. This is furthermore a natural sequence since it may be necessary thereafter to rotate the steering post so as to align the slot 10 with the head of the locking bolt 22 before the steering lock can become effective.

Arranged within the box and adjacent the head 76 of the plunger are two oppositely disposed contacts 80 and 81 with which are connected terminals 82 and 83 respectively, these terminals being extended to the exterior of the box so as to facilitate connection therewith of suitable conductors forming part of the ignition circuit. A metallic disk or plate 84 is positioned adjacent the head, being adapted to rest against the two contacts 80 and 81, thereby bridging the gap therebetween when the parts are as shown in Fig. 8. A coiled spring 85 bears with one of its ends against the cap 72 wherein may be formed a socket, as shown, and with its other end against the plate 84 so as to project this latter element toward the two contacts and also to force the plunger inwardly to the position shown in Fig. 8, when the rock shaft is in the proper rotative position for this purpose. It will be apparent that the plate 84, in conjunction with the two contacts 80 and 81, constitutes a switch which will operate to close or open the ignition circuit which is connected with the two terminals 82 and 83.

According to the construction herein set forth, when the ignition circuit controlling the motor operation is broken, this action is followed immediately by a locking of the steering mechanism. This double locking is accomplished with the manipulation of but two parts, namely, the safety pin and operating handle 32. This double locking of the vehicle is furthermore under the control of a single cylinder lock, the operation of which is dependent upon the use of a proper key.

The present structure is particularly adapted for installation during assembly of the steering mechanism and associated parts upon the automobile. Its application to the steering column may, however, be performed subsequently by removal of the steering wheel, supporting bracket, and substitution of the structure herein shown.

In Figs. 13 and 14 the present lock is shown applied to a steering column wherein are contained certain concentric tubes forming part of the operating connections leading to the steering wheels, spark advance, carburetor throttle, and gear shift. The present lock may be associated with a column having also these several parts so as to co-operate therewith to lock the several mechanisms controlled thereby.

Referring to Fig. 13 the lock housing is shown as having a bracket connection in the plate F with the dash instrument board (not shown). Interiorly of the housing is a passage or chamber wherein is mounted the slidable locking bolt 22 here represented as formed with a head 24 of reduced size. Contained within the column is the steering post C to which is secured a collar D formed with an opening or slot 10 adapted to receive the acting end of the locking bolt. A second opening or slot 25 registering therewith is also formed in the column so as to permit the locking bolt to function in the intended manner.

Interiorly of the post are shown certain concentric tubes designated as G, H and I respectively, each forming part of the operating connections which extend from suitable controls (not shown) to the gear shift, carburetor throttle, and spark advance mechanism. Each of these tubes is independently movable either in a rotary or longitudinal direction for transmitting the desired motion. Formed in each of these tubes are openings or slots 90, 91 and 92, each adapted to register with the others, and also with other openings 25 and 93 formed respectively in the column and steering post. The openings in the three inner tubes, however, are shown as slightly reduced in size so as to receive the reduced head 24 of the locking bolt. With projection of this bolt to forward position under the influence of the spring 26, the head 24 will enter the openings in the three inner tubes and the body of the bolt will lie within the openings in the steering post, collar, and column. Obviously the use of the collar D with such a construction can be dispensed with, although for purposes of security it may be desirable. The shoulder 23 formed near the acting end of the locking bolt by its reduced head will, in the construction shown, engage with the outermost of the three inner tubes so as to limit the inward movement of the bolt.

The construction of Fig. 13 is suggestive of one application of this invention. In Fig. 14 a very similar construction is set forth, the only difference being that the steering post C is here represented as occupying an innermost position in the column, and as being surrounded by the three tubes G, H, and I, which connect with the spark, gas and gear shift. The column B may, furthermore, have a rotatable mounting so as itself to transmit motion to an operating unit of the automobile, such, for example, as the steering mechanism, in which case the lock of the present invention will be equally effective since projection of the locking bolt, of necessity, results in its engagement with the column such as to prevent rotation thereof. The operation of locking the several mechanisms hereinbefore set forth is performed in the manner described, and results in completely disabling the automobile.

I claim:

1. In combination with a steering mechanism, a locking device therefor consisting of a spring actuated locking member adapted in one position to interfere with steering operations, a cam shaft adapted to withhold and withdraw the locking member from interfering position, a key-controlled cylinder lock having an eccentric, a pin movable toward and from the shaft and adapted to restrain movement thereof when the shaft is in one position, and a spring in engagement with the pin adapted to be engaged also by the eccentric in a manner whereby the cylinder lock, when operated, may disengage the pin from the shaft, substantially as described.

2. In combination with a steering mechanism, a locking device therefor consisting of a movable locking member adapted in one position to interfere with steering operations, a key-controlled lock therefor, and operative connections between the lock and said member including a pin and a spring, the former deriving its motion from the latter and serving to govern the movements of the locking member, the spring being movable counter to its tension with operation of the key-controlled lock, substantially as described.

3. In combination with a steering mechanism, a housing associated therewith and containing within its body a bolt adapted in one position to interfere with steering operations, a key-controlled lock, and a train of connections between the lock and bolt including as one element a spring in engagement with the lock and co-operating therewith to move an associated part in either of two opposite directions, substantially as described.

4. In combination with a column enclosing a steering post, a housing surrounding the column, there being also an opening in the column adjacent the housing, locking mechanism contained within the housing including a spring actuated bolt adapted to project its acting end through the column opening to engage with the steering post, a rock shaft co-operating with the bolt and adapted to retract the same when turned to one position, and when turned to another position to permit advancement of the bolt, a key-controlled lock, and means, including a spring, forming a train of operative connections between the lock and rock shaft adapted to hold the latter against movement from a position wherein the bolt is engaged with the steering post, substantially as described.

5. In an automobile, the combination of a rotatable steering member, a housing associated therewith, means within the housing adapted to lock the member against movement whereby the steering operations are disabled, a rotatable operating means therefor having in its periphery a radial socket and a detent receivable within the socket to restrain movement of the operating means when in one position only, a spring connected with the detent, and a rotatable cylinder lock having an eccentric movable to engage the spring whereby to withdraw the detent from interfering position relative to the operating means, substantially as described.

6. In combination with a steering column having therewithin a post forming part of a steering mechanism, a housing associated with the column and adapted to be secured against rotation relative thereto, a locking bolt within the housing adapted to be projected through the column into engagement with the post therewithin to disable the steering mechanism, operating means for said bolt, a rotatable key-controlled lock, and a train of connections between said operating means and the key-controlled lock, including a spring through which a one-way motion is transmitted from the lock, substantially as described.

7. In combination with a steering column having therewithin a rotatable post forming part of a steering mechanism, a housing associated with the column and secured against rotation relative thereto, locking means contained within the housing adapted to be projected through the column into engagement with the steering post to interfere with movements thereof, and other means governing the operation of said locking means including a key-controlled lock, a spring actuated pin adapted to be moved in one direction by the key-controlled lock, a rock shaft whose movements are adapted to be interfered with by the pin when in one position, and other spring means co-operating with the pin to check advancement thereof immediately following its release from the rock shaft, substantially as described.

8. In combination with an automobile having a fixed part and adjacent thereto a steering column, a housing associated with the column and containing locking means for interfering with steering operations of the automobile, there being a slot formed exteriorly of the housing, a plate having an angular bend adjacent one edge, means for securing the bent edge of the plate within the housing slot whereby the plate body is permitted to extend toward the fixed part to rest flat thereupon, and means for securing the plate to the fixed part, substantially as described.

9. In combination with an automobile having a fixed part and adjacent thereto a steering column, a lock housing associated with the column and providing controllable means for interfering with steering operations of the automobile, there being in the lock housing a slot, a bracket plate secured rigidly to the fixed part having one edge receivable within the slot, and means for securing said edge detachably to the lock housing, substantially as described.

10. In a lock, a bolt, a movable operating means therefor having a surface recess therein, a lock connected with said means to control the movements thereof in one direction, and a spring pressed safety device engageable within the recess of the operating means to prevent its movement in the opposite direction, substantially as described.

11. In an automobile, the combination of a rotatable steering member, a housing associated therewith, means within the housing adapted to lock the member against movement whereby the steering operations are disabled, and operating means therefor including a manipulative element, a key-controlled lock, and a safety device, the safety device when moved permitting operation of the manipulative element in one direction, and the key-controlled lock when moved permitting operation of the manipulative element in another direction, substantially as described.

12. In an automobile lock, the combination with a rotatable member, of means advanceable into engagement with said member to lock the same against movement, and operating means therefor including a manipulative element, a key-controlled lock co-acting therewith, and a safety device also engageable with the manipulative element, the key-controlled lock, when operated, preventing movement of the manipulative element in both directions, and the safety device preventing movement of the manipulative element in one direction only, substantially as described.

ORVILLE S. HERSHEY.